(12) United States Patent
Newton et al.

(10) Patent No.: US 10,904,597 B2
(45) Date of Patent: *Jan. 26, 2021

(54) DYNAMIC BINDING FOR USE IN CONTENT DISTRIBUTION

(71) Applicant: LEVEL 3 COMMUNICATIONS, LLC, Broomfield, CO (US)

(72) Inventors: Christopher Newton, Westlake Village, CA (US); David Fullagar, Boulder, CO (US)

(73) Assignee: Level 3 Communications, LLC, Broomfield, CO (US)

(*) Notice: Subject to any disclaimer, the term of this patent is extended or adjusted under 35 U.S.C. 154(b) by 104 days.

This patent is subject to a terminal disclaimer.

(21) Appl. No.: 16/458,876

(22) Filed: Jul. 1, 2019

(65) Prior Publication Data

US 2019/0327507 A1 Oct. 24, 2019

Related U.S. Application Data

(63) Continuation of application No. 15/728,711, filed on Oct. 10, 2017, now Pat. No. 10,341,700, which is a
(Continued)

(51) Int. Cl.
*H04N 21/24* (2011.01)
*H04N 21/231* (2011.01)
*H04L 29/08* (2006.01)

(52) U.S. Cl.
CPC ..... *H04N 21/2405* (2013.01); *H04L 67/1034* (2013.01); *H04N 21/23103* (2013.01); *H04N 21/2402* (2013.01)

(58) Field of Classification Search
CPC .................................................. H04N 21/2405
See application file for complete search history.

(56) References Cited

U.S. PATENT DOCUMENTS 6,553,413 B1 4/2003 Leighton et al.
6,959,333 B2 10/2005 Beaumont et al.
(Continued)

FOREIGN PATENT DOCUMENTS

JP 2003067279 3/2003
JP 2003085067 3/2003

OTHER PUBLICATIONS

Canadian Examination Report, dated Feb. 6, 2017, Application No. 2,798,054, filed May 3, 2011, 3 pgs.
(Continued)

*Primary Examiner* — Nicholas P Celani (57) ABSTRACT

Provided are methods and systems for dynamic binding in the context of content delivery. For example, the methods and systems may be implemented as a dynamic binding process that maps a content provider to a first set of content servers in a content distribution network. The dynamic binding process may then facilitate the content to be received from the content provider so that the content can be distributed by the first set of content servers in the content distribution network. The dynamic binding process further monitors network traffic associated with the content from the content provider and determines at least one metric associated with the network traffic. Additionally, the dynamic binding process can remap the content provider to a second set of content servers in the content distribution network based on at least one of the metrics.

18 Claims, 6 Drawing Sheets

Related U.S. Application Data continuation of application No. 12/773,086, filed on May 4, 2010, now abandoned.

(56) References Cited

U.S. PATENT DOCUMENTS

| | | | |
|---|---|---|---|
| 2003/0065762 A1* | 4/2003 | Stolorz | H04L 43/04 709/223 |
| 2003/0099237 A1 | 5/2003 | Mitra et al. | |
| 2005/0198238 A1 | 1/2005 | Sim et al. | |
| 2006/0161604 A1 | 7/2006 | Lobo | |
| 2006/0235991 A1 | 10/2006 | Brown et al. | |
| 2006/0262927 A1 | 11/2006 | Rutkowski et al. | |
| 2007/0118549 A1 | 5/2007 | Bornhoevd et al. | |
| 2008/0270605 A1 | 10/2008 | Berstis et al. | |
| 2009/0132648 A1 | 5/2009 | Swildens et al. | |
| 2009/0150518 A1 | 6/2009 | Lewin et al. | |
| 2009/0254661 A1 | 10/2009 | Fullagar et al. | |
| 2010/0011002 A1 | 1/2010 | Gerovac | |
| 2011/0276679 A1 | 11/2011 | Newton | |
| 2018/0115793 A1 | 4/2018 | Newton et al. | |

OTHER PUBLICATIONS

European Acceptance Communication under Rule 71(3) EPC, Application No. 11778137.7, filed May 3, 2011, 35 pgs.
European Examination Report, dated Jan. 18, 2016, Application No. 11778137.7, filed May 3, 2011, 5 pgs.
Extended European Search Report, dated Jun. 27, 2014, Application No. 11778137.7, filed May 3, 2011, 5 pgs.
International Search Report, Intl. Application No. PCT/US11/34906, Intl. Filing Date May 3, 2011, ISR dated Sep. 2, 2011, 3 pgs.
Japanese Decision of Rejection, dated Apr. 7, 2015, Application No. 2013-509165, filed May 3, 2011, 4 pgs.
Summons to Attend Oral Proceedings, dated Aug. 12, 2016, European Application No. 11778137.7, filed May 3, 2011, 4 pgs.
Written Opinion, Intl. Application No. PCT/US11/34906, Intl. Filing Date May 3, 2011, Written Opinion dated Sep. 2, 2011, 4 pgs.

* cited by examiner

DYNAMIC BINDING FOR USE IN CONTENT DISTRIBUTION

CROSS-REFERENCE TO RELATED APPLICATIONS

This application is a continuation of and claims the benefit of priority from U.S. patent application Ser. No. 15/728,711, entitled "DYNAMIC BINDING FOR USE IN CONTENT DISTRIBUTION," filed Oct. 10, 2017, which application is a continuation of and claims the benefit of priority from U.S. patent application Ser. No. 12/773,086, entitled "DYNAMIC BINDING FOR USE IN CONTENT DISTRIBUTION," filed May 4, 2010, the entire contents of which are fully incorporated by reference herein for all purposes.

BACKGROUND

The Internet and the so-called World Wide Web (the "WWW") have become ubiquitous. Thousands or even tens of thousands of so-called content providers (publishers) now use the Internet (and, particularly, the WWW) to provide all sorts of content to tens or even hundreds of thousands of clients all over the world.

In order to offload the job of serving some or all of their content, many content providers now subscribe to so-called content delivery networks (CDNs). Using a CDN, some (or all) of a content provider's content can be served to clients (e.g., users who request content) from the CDN (i.e., from one or more servers in the CDN) instead of from the content provider's server(s). In a caching CDN, content that is served may also be cached on some or all of the CDN servers, either before being served or in response to specific requests for that content.

The term content as used herein means any kind of data, in any form, regardless of its representation and regardless of what it represents. Content may include, without limitation, static and/or dynamic images, text, audio content, including streamed audio, video content, including streamed video, web pages, computer programs, documents, files, and the like. Some content may be embedded in other content, e.g., using markup languages such as hypertext markup language (HTML) and extensible markup language (XML). Content includes content which is created or formed or composed specifically in response to a particular request. The term "resource" is sometimes used herein to refer to content.

Because the CDN provides services related to distributing content providers' content, content providers are sometimes referred to herein as customers of the CDN or customers of the CDN provider. The CDN provider typically maintains and operates content servers or server clusters (groups of multiple servers) at multiple locations in and around the CDN. The servers or clusters are often located at numerous different geographic regions (e.g., metropolitan areas) so that content can be stored proximate to users who request the content. The CDN often includes servers at the edge of the network (so-called "edge servers") and servers within the core of the network (so-called "origin servers"). Origin servers may store or retrieve content and furnish the content to the edge servers, which may in turn cache the content for later distribution.

The edge servers are typically close to users who request the content. In such a configuration, content that is requested that resides on a proximate edge server can be distributed more quickly or efficiently to the requesting user. In an ideal world, all possible content would be stored on proximate edge servers; however, in reality such an arrangement is impractical because of limited resources and costs associated with operation of the content servers. As such, in actual operation, a limited amount of content is selected for storage on the edge servers. Often, only the most popular (e.g., more often requested) content is stored on the edge servers. As content popularity changes, less popular content is replaced with more popular content within the limited storage space of the edge servers.

CDN operators must determine the amount of CDN server capacity and which CDN servers will be used to handle distribution of each customer's content. If too much server capacity is allocated to a customer, the servers may be relatively idle, while allocating too little server capacity to a customer may result in overloading on servers. To complicate matters, distribution of different sized content objects results in different load characteristics. Further, as popularity of a customer's content changes, earlier decisions as to which servers and how much server capacity to handle the customer's content may no longer be appropriate.

SUMMARY

Embodiments presently disclosed generally relate to dynamically determining server capacity to allocate to a customer of a CDN. Embodiments further include methods and systems for associating a CDN customer with one or more servers in a CDN. Associating a CDN customer with one or more servers in a CDN is referred to herein as binding. When a customer is bound to a server or server cluster at least a portion of the server or server cluster handles distribution of the customer's content to clients. Binding can be changed dynamically as a function of one or more characteristics of a customer's content or traffic related to the customer's content. For example, the library size of a customer and/or the number of requests for the customer's content may influence how many servers are bound to the customer.

Some embodiments of computer program products include one or more computer-readable media storing computer-executable instructions. When executed, the computer-executable instructions cause a general purpose computer to carry out one or more algorithms.

DETAILED DESCRIPTION

Figure 1:
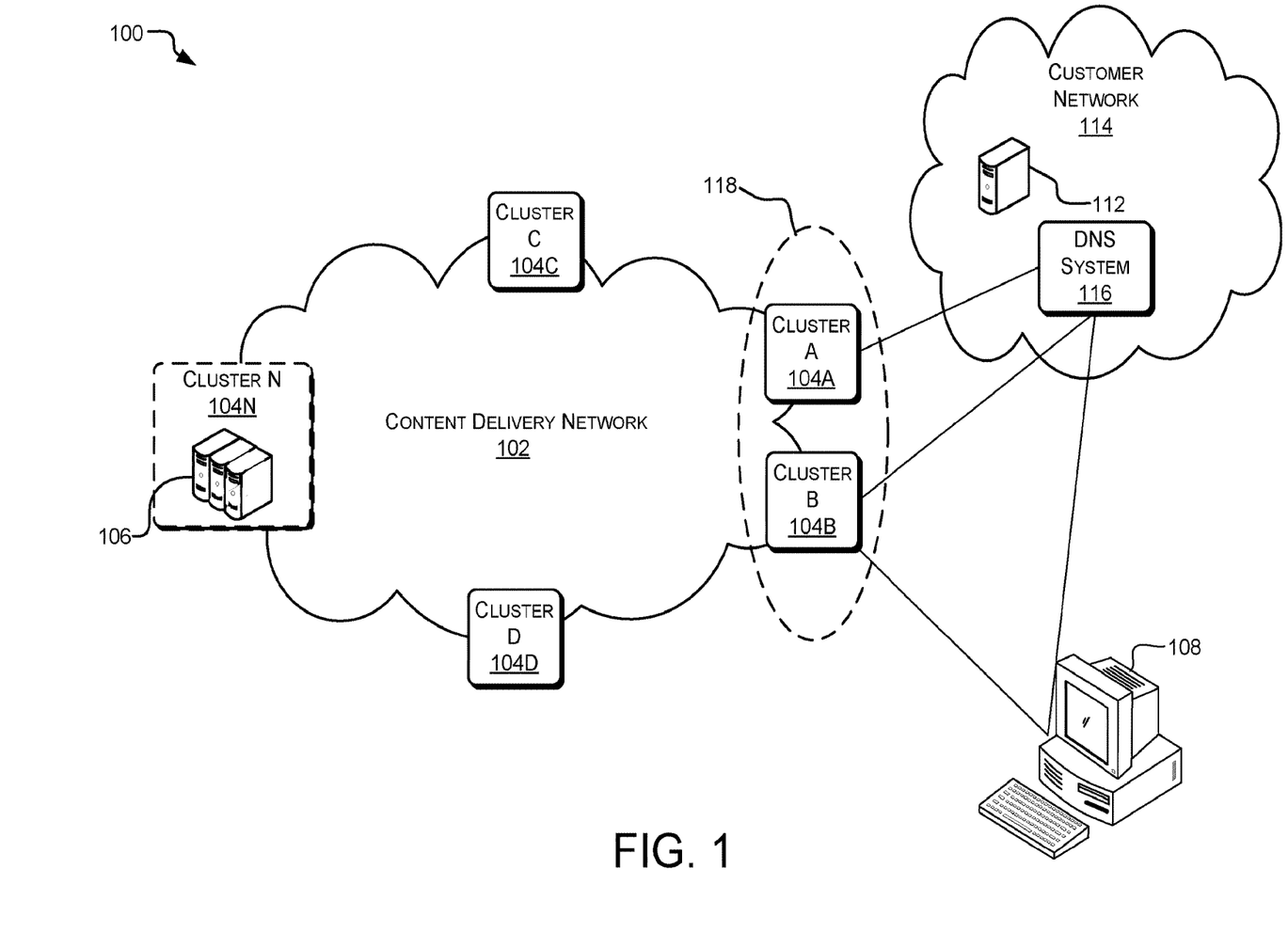
FIG. 1 illustrates an example network environment suitable for implementing dynamic binding according to an embodiment.

FIG. 1 illustrates an example network environment 100 suitable for implementing dynamic binding according to an embodiment. Binding refers to mapping of a content provider (e.g., content distribution network (CDN) customer) to one or more CDN servers or clusters. Dynamic binding refers to binding that adapts automatically as network metrics associated with the CDN customer's content or related traffic change. In the illustration of FIG. 1, a CDN 102 includes one or more server clusters 104. Each server cluster 104 includes one or more server computers or racks 106 (shown only in cluster 104N for ease of illustration) configured to respond to content requests from one or more user clients 108. A rack typically includes multiple servers (e.g., 24 servers).

In the illustrated embodiment, a content provider operates a customer network 114, which is a customer of the CDN 102. Content on a content provider server 112 can be propagated to the server clusters 104 in CDN 102 and, according to one example embodiment, the content is cached on servers 106 of the clusters 104.

Client 108 may request content provided by the content provider that operates customer network 114. Customer network 114 includes one or more domain name server (DNS) systems 116. DNS system 116 is configured to direct content requests to a server (e.g., server 106) or cluster (e.g., cluster 104A) in the CDN 102 that can deliver the requested content. Generally, a request, such as a hypertext transport protocol (HTTP) request, generated by the client computer 108 is received by the DNS system 116. The DNS system 116 uses a uniform resource locator (URL) name in the request to look up an address of a server 106 or cluster 104 that can provide the requested content. Note that such a DNS lookup can occur within CDN 102 (i.e., as part of a CDN DNS configuration) in addition to or in lieu of the lookup performed by DNS system 116.

The content provider is typically associated with, or bound to, one or more selected clusters 104 or servers 106 in the CDN 102. Content of the content provider is distributed by the clusters 104 or servers 106 to which the content provider is bound. For example, in the illustrated embodiment, the customer network 114 may be bound to cluster 104A and cluster 1048 in cluster group 118.

During operation, the DNS system 116 receives information, such as one or more load metrics, from clusters 104. The DNS system 116 uses load metrics to facilitate the determination of which cluster 104 should provide requested content. As discussed in further detail below, the DNS system 116 is also operable to determine which clusters 104 or servers 106 the content provider is bound to. In this regard, the DNS system includes a dynamic binding system that can dynamically adapt the binding of the content provider to clusters 104 and/or servers 106 in the CDN 102.

In one embodiment, the servers 106 report metrics to the DNS system 116. The DNS system 116 includes dynamic binding functionality to adjust bindings according to an algorithm. In one embodiment, the dynamic binding algorithm combines multiple metrics and adjusts bindings based on the combination.

In one embodiment, as content or traffic characteristics change, the customer of the customer network 114 can be dynamically bound to selected servers 106 or clusters. For example, as the server load increases or library size increases, more servers may be bound to the customer network 114. Conversely, as load decreases or library size decreases, the number of servers within a cluster or the number of clusters bound to the customer may be reduced. In this manner, server resources, such as storage space, processor speed or bandwidth can be efficiently allocated automatically.

The binding chosen for a given customer may also depend on geographic considerations. The customer may be restricted to particular one or more geographic regions. For example, a customer may have clients only in the United States (US). In this example, the customer will be bound to clusters in the US, but not clusters in other regions of the world. As another example, the customer may only have clients in the western US. In this case, the customer may be bound only to clusters in the western US.

The binding selected for a given customer may also depend on the type of infrastructure available at clusters. Some clusters may include special hardware on some servers that are not on other servers. For example, some servers have flash memory (e.g., flash solid state drives (SSD)) which works well for distributing small objects of content. In this example, customers that publish many small objects can be bound to clusters or servers that have flash memory. Other hardware or software characteristics may be on servers or clusters that make those particular servers or clusters beneficially bound to particular customers that provide particular types of content.

Figure 2:
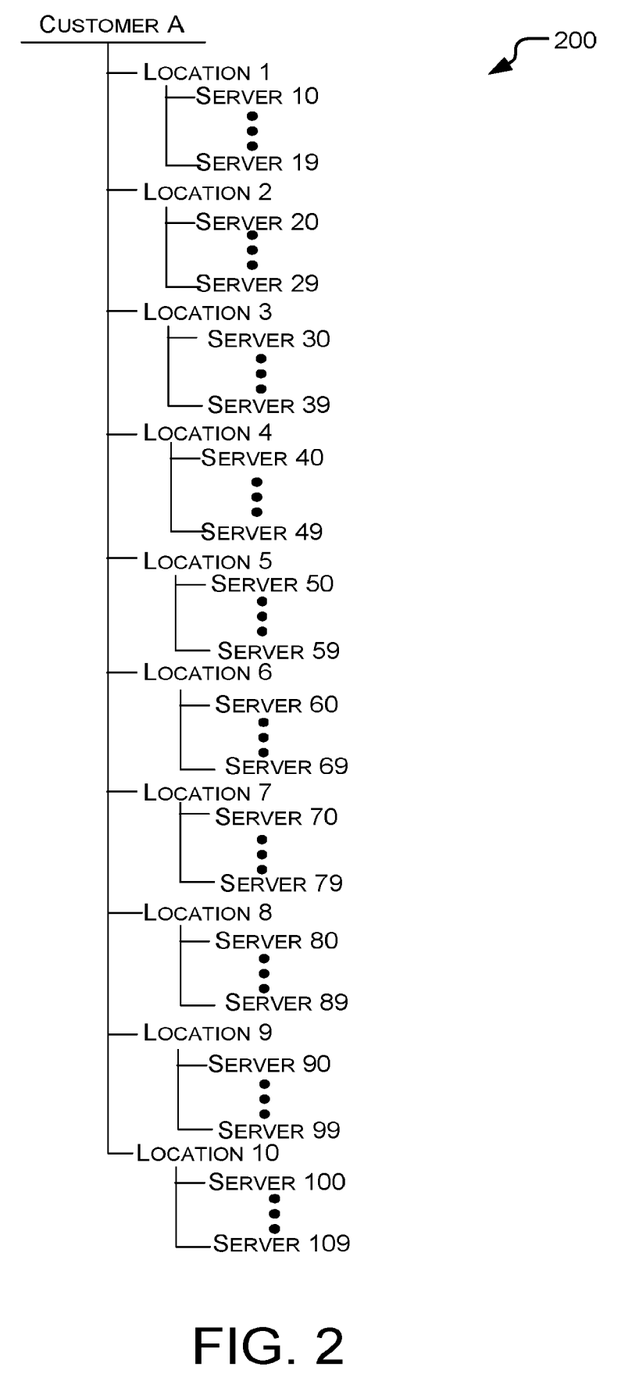
FIG. 2 is a binding map illustrating one possible binding of a content provider customer to a number of servers.

FIG. 2 illustrates an example binding graph 200 in accordance with one possible embodiment. The binding graph 200 includes the maximum server allocation to Customer A and is subdivided by location among ten locations (e.g., Location 1-Location 10). The locations may correspond to metropolitan locations, such as Los Angeles, New York City, London, and so on. A number of servers are at each location and can be allocated to Customer A. The servers shown in the binding map 200 are allocated to Customer A according to characteristics of Customer A's content and associated traffic. In the particular example shown in FIG. 2, there is a cluster of ten servers at each location. Of course, in actual operation there may be more or fewer locations and servers than those shown in FIG. 2.

To illustrate an example binding, Customer A may be allocated 10% of the network server capacity by default. Such a binding may involve allocating one server at each location to Customer A. For example, Customer A may be initially bound to Server 10, Server 20, Server 30, Server 40, Server 50, Server 60, Server 70, Server 80, Server 90 and Server 100. A traffic monitor monitors one or more metrics associated with the servers and content. As the metrics change, the binding for Customer A may change dynamically. For example, if the load increases above a determined threshold, Customer A may be allocated 20% of the network server capacity. In this case, Customer A may then be bound to two servers at each location.

Figure 3:
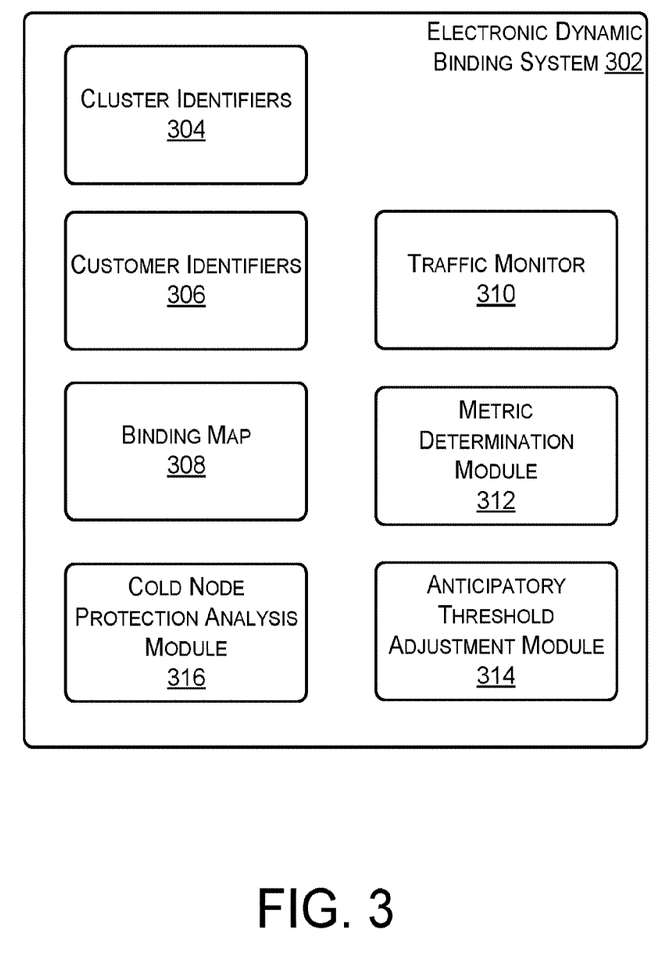
FIG. 3 illustrates an example electronic dynamic binding system configured to perform dynamic binding according to an embodiment.

FIG. 3 illustrates an example electronic dynamic binding system 302 configured to perform dynamic binding according to an embodiment. The electronic binding system 302 may be implemented in one or more computing devices, such as, but not limited to the general purpose computer shown in FIG. 6 and described below. The electronic dynamic binding system 302 includes a number of functional modules and data, such as cluster/server identifiers (IDs) 304, customer IDs 306, a binding map 308, traffic monitor 310, metric determination module 312, threshold adjustment module 314, and cold node protection module 316.

Cluster/server IDs 304 includes a list of identifiers of available content servers and/or clusters in the CDN. The cluster/server IDs 304 may be organized in some manner, such as according to metropolitan area. Customer IDs 306 includes a list of identifiers (e.g., names) of customers of the CDN. The binding map 308 associates each customer ID from the customer IDs 306 with one or more cluster/server IDs from the cluster/server IDs 304. The binding map 308 is adjusted from time to time as content distribution metrics change.

Traffic monitor 310 monitors network traffic associated with content distribution. In one embodiment the traffic monitor 310 gathers content requests handled at each server and/or cluster. The metric determination module 312 uses network traffic data from the traffic monitor 310 to generate one or more content distribution metrics. Example metrics that may be determined include, but are not limited to, central processing unit (CPU) overhead, bandwidth, latency, content popularity, library size and content size (e.g., file size, object size).

Some embodiments of the metric determination module 312 employ load monitoring. In some embodiments the CPU overhead of every transaction (e.g., customer with small objects) is determined. In some embodiments, the metric determination module 312 determines how quickly content can be retrieved off disk (e.g., customer with large objects).

In some embodiments, the metric determination module 312 may also be configured to generate a composite metric that is a combination of multiple metrics. For example, the metric determination module 312 could generate a weighted average of CPU overhead, latency, content size or popularity associated with content from each customer.

The threshold adjustment module 314 adjusts a network percentage threshold based on the metrics from the metric determination module 312. To illustrate, if the CDN is delivering more than (or, in some embodiments, less than) X % of total network traffic for a given customer, the binding is adjusted for the customer to provide sufficient for X % of traffic and to spread traffic around the CDN in order to prevent "hot spots". For example, the binding for the customer can be adjusted to include more servers in a location where the bandwidth is particularly high for the customer's content.

In one embodiment, the threshold adjustment module 314 employs an anticipatory adjustment algorithm. In such embodiments, the cluster/server mapping is made in advance of an actual change in traffic associated with a customer. For example more clusters may be bound to a customer in anticipation of an increase in requests for the customer's content at a particular location.

Cold node protection module 316 provides functionality related to a content server that is newly associated with a content provider. In one embodiment, the cold node protection module 316 gradually allows content requests to go to a content server that has been newly bound to a content provider. In other words, when a content server is first bound to a content provider, the number of content requests that the content server receives is limited so that the new content server can gradually begin handling requests and gradually filling the cache with requested content.

In one embodiment, automatic cold node protection module 316 automatically reduces load to a newly added server or cluster to prevent a sudden barrage of content requests. When a new server/cluster goes online, the new server/cluster will report an artificially high load to prevent sudden barrage of content requests. Over time, as the new server/cluster caches more content, the server/cluster automatically reduces the amount of load reported. The new server/cluster can automatically determine metrics related to responses to requests (e.g., count of new object requests (not cached), total cache efficiency, response time, etc.). A shed factor can also be employed. Generally, a shed factor relates to the amount of traffic that would have been sent to a server/cluster (i.e., due to network proximity to client and load) but, instead, is shed away from that location to a secondary server/cluster. For instance, when a shed factor of 50% is set, only half the requests that should have been directed to a particular server/cluster are in fact directed to that particular server/cluster. For example, if cache efficiency drops below 80%, then the server/cluster is checked for performance. Such a process can prevent a server or cluster from being left in artificially high reporting mode in a manual environment.

Figure 4:
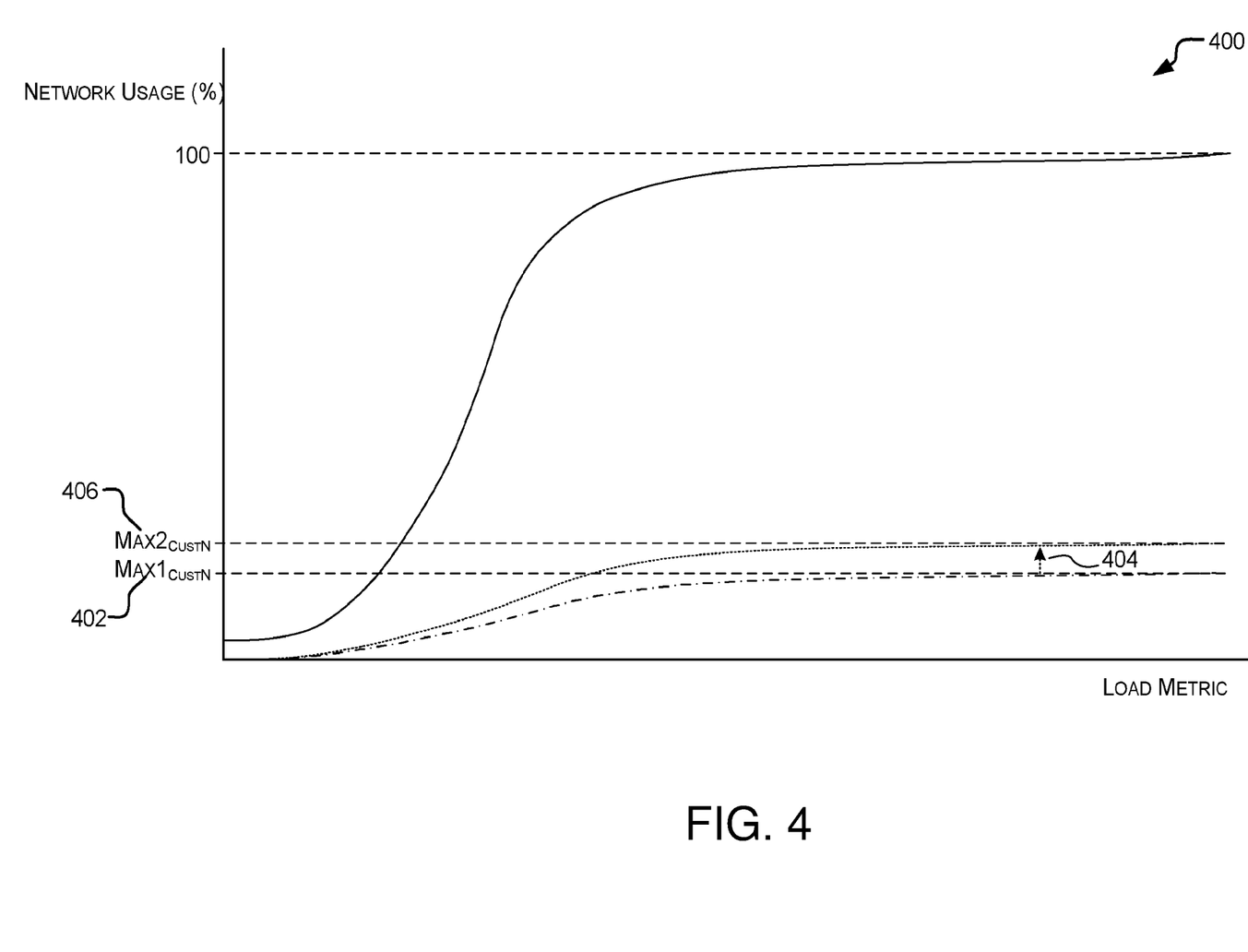
FIG. 4 is a graph illustrating a theoretical model of network usage as a function of a load metric in accordance with an embodiment.

FIG. 4 is a graph illustrating a theoretical model 400 of network usage as a function of a load metric in accordance with an embodiment. The model 400 illustrates an exemplary shift in server capacity threshold as a metric changes for a given customer (Customer N). The load metric may be a composite metric that is a combination of one or more metrics, such as CPU overhead, data retrieval speed, latency, popularity or others.

In the illustrated embodiment, threshold MAX1 402 is initially assigned to Customer N. In other words, the maximum server capacity initially allocated to Customer N is MAX1 percent of the entire network capacity. As the load metric increases, the threshold is shifted 404 upward to a new threshold, MAX2 406.

In some embodiments, the shift 404 occurs prior to the actual need for additional server capacity. In these embodiments, the maximum server capacity need is anticipated. When the load metric decreases again, the threshold is shifted back down to MAX1 402

In some embodiments, hysteresis is used in shifting 404 the server capacity threshold. Hysteresis can eliminate "jerky" changes in the server capacity threshold.

Figure 5:
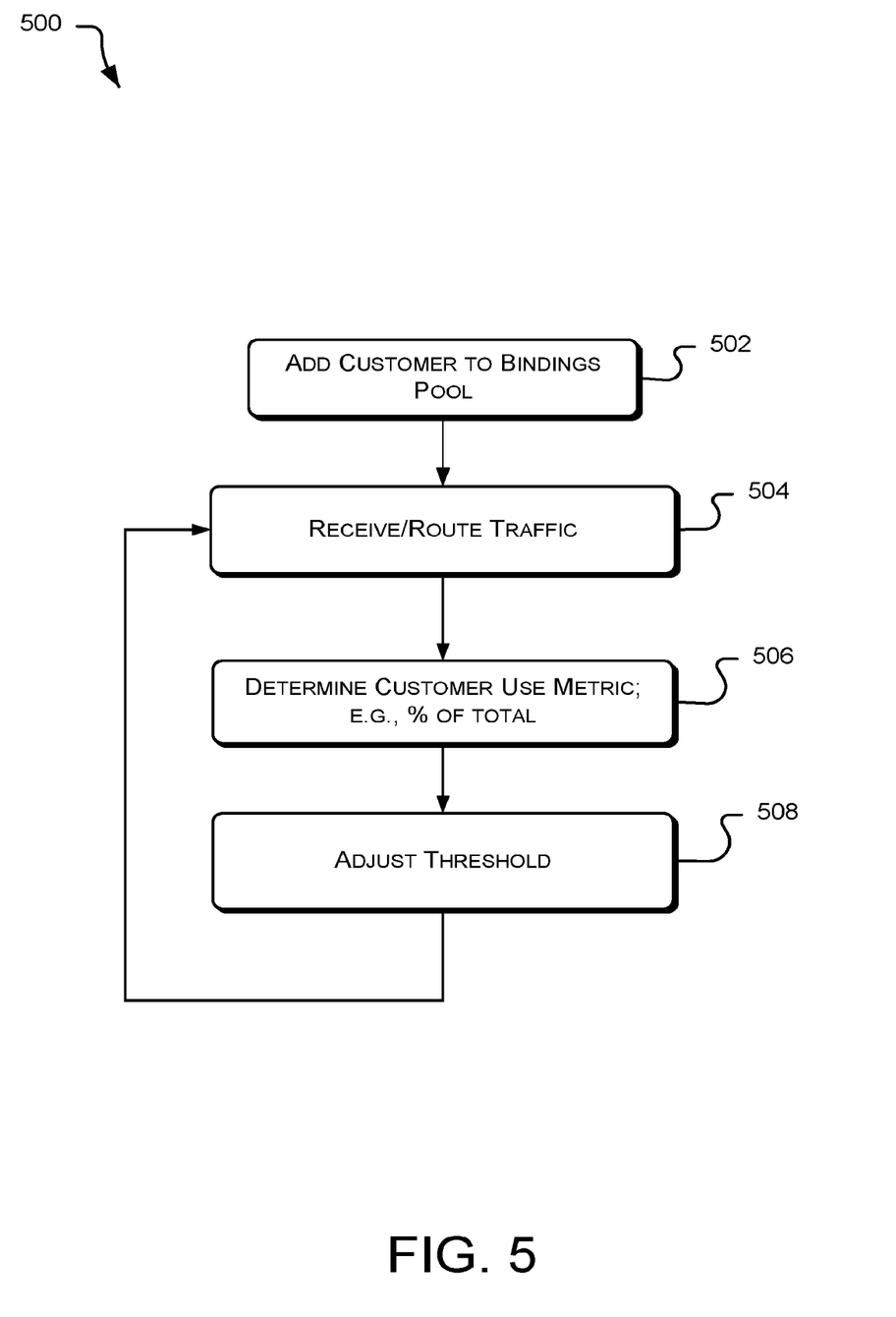
FIG. 5 is a flow chart illustrating an example algorithm for performing dynamic binding according to an embodiment.

FIG. 5 is a flow chart illustrating a dynamic binding algorithm 500 according to one embodiment. The dynamic binding algorithm 500 may be carried out by a system, such as dynamic binding system 302 (FIG. 3), or one or more other systems.

An adding operation 502 adds a new customer to a registry of customers (e.g., customer IDs 304, FIG. 3). The registry includes identifiers for customers that employ the content distribution network (CDN) to distribute their content. In one embodiment, the adding operation 502 adds a new customer identifier to a customer registry and chooses a default server capacity threshold.

After the server capacity threshold is selected, adding operation 502 binds the new customer to a default set of one or more CDN servers or clusters corresponding to the selected server capacity threshold. Binding the new customer to a default set of one or more CDN servers or clusters may involve associating the new customer ID with one or more default CDN server or cluster IDs. Example customer-to-server bindings are shown in the binding graph of FIG. 2. The default set of clusters or servers may be chosen to provide a default level of storage and may correspond to a default load at numerous geographic locations around the CDN. Additionally, in one example embodiment, each customer has a different default set of clusters or servers.

A receiving operation 504 receives one or more requests for content from the customer added in operation 502. After a number of content requests are received for content a determining operation 506 determines a use metric associated with the content provider. The metric may be a combination of one or more metrics, such as number of files requested, size of files requested, total data amount requested, and so on. In one embodiment, the determining operation 506 determines a percentage of total CDN bandwidth associated with the content provider based on the metrics.

Based on the determined CDN bandwidth percentage from operation 506, an adjusting operation 508 adjusts maximum server capacity threshold associated with the content provider. Adjusting operation may employ a hysteresis algorithm in order to smooth the adjustment between thresholds. Hysteresis parameters may be configurable. As discussed earlier, the threshold represents an upper limit of CDN storage allocated to the content provider (or, according to an example embodiment, the threshold represents a lower limit). The threshold is used to determine how many clusters or servers are bound to the content provider. The process 500 typically repeats continuously for each customer of the CDN.

Figure 6:
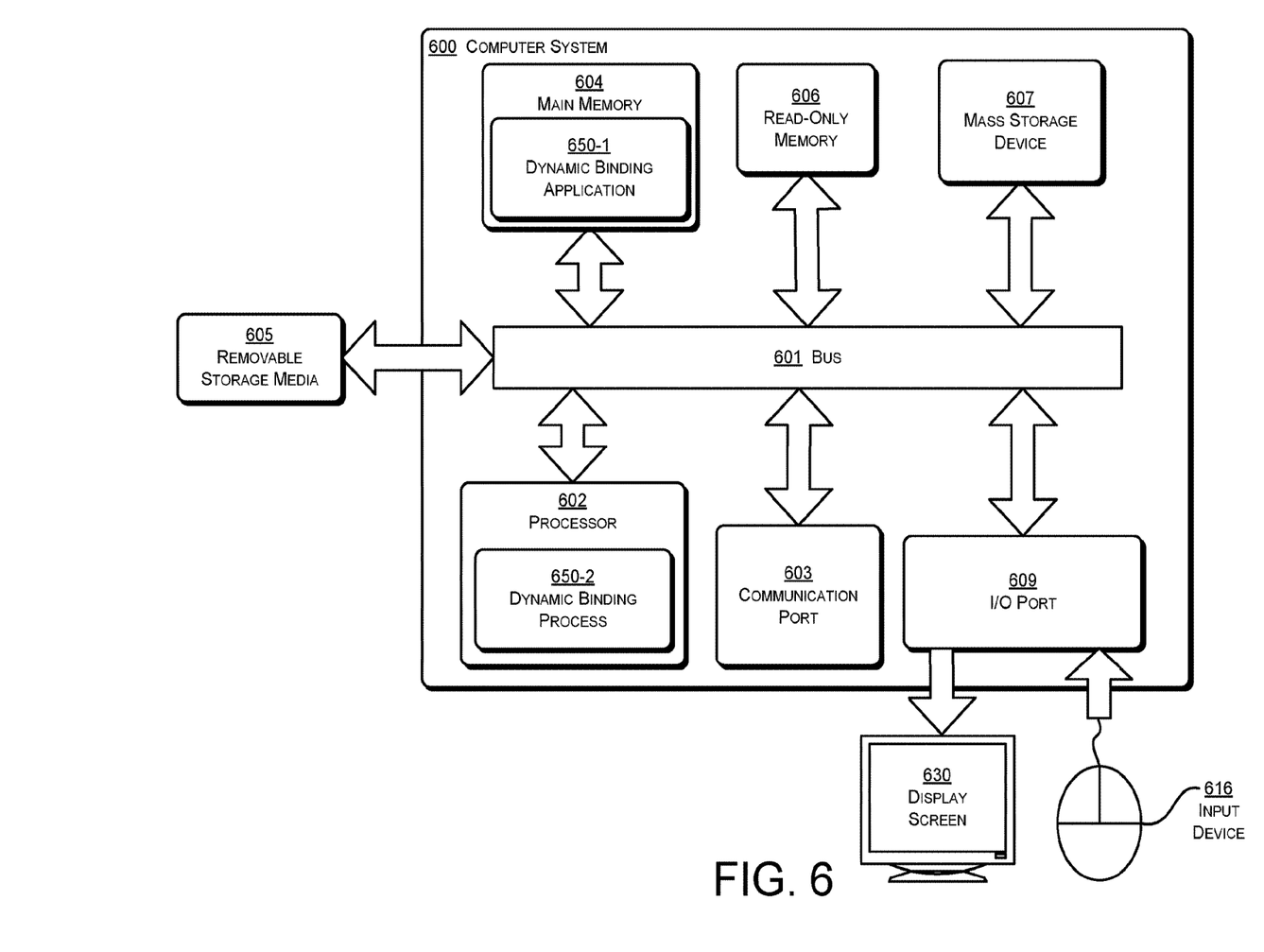
FIG. 6 is an example block diagram of a computer system encoded with a dynamic binding application and process according to embodiments herein.

FIG. 6 is a schematic diagram of a computer system 600 upon which embodiments of the present invention may be implemented and carried out. For example, one or more computing devices 600 may be configured to bind a customer to a default set of clusters or servers, monitor traffic associated with the customer's content, generate one or more metrics and bind the customer to another set of clusters or servers depending on the one or more metrics. Computer system 600 generally exemplifies any number of computing devices, including general purpose computers (e.g., desktop, laptop or server computers) or specific purpose computers (e.g., embedded systems).

According to the present example, the computer system 600 can include a bus 601 (i.e., interconnect), at least one processor 602, at least one communications port 603, a main memory 604, a removable storage media 605, a read-only memory 606, and a mass storage 607. Processor(s) 602 can be any known processor, such as, but not limited to, an Intel® Itanium® or Itanium 2® processor(s), AMD® Opteron® or Athlon MP® processor(s), or Motorola® lines of processors.

Communications ports 603 can be any of, but not limited to, an RS-232 port for use with a modem based dial-up connection, a 10/100 Ethernet port, a Gigabit port using copper or fiber, or a USB port. Communications port(s) 603 may be chosen depending on a network such as a Local Area Network (LAN), a Wide Area Network (WAN), or any network to which the computer system 600 connects. The computer system 600 may be in communication with peripheral devices (e.g., display screen 630, input device 616) via, for example, but not limited to, Input/Output (I/O) port 609, etc.

Main memory 604 can be Random Access Memory (RAM), or any other dynamic storage device(s) commonly known in the art. Read-only memory 606 can be any static storage device(s) such as Programmable Read-Only Memory (PROM) chips for storing static information such as instructions for processor 602. Mass storage 607 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 601 communicatively couples processor(s) 602 with the other memory, storage and communications blocks. Bus 601 can be a PCI/PCI-X, SCSI, or Universal Serial Bus (USB) based system bus (or other) depending on the storage devices used. Removable storage media 605 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 604 is encoded with a dynamic binding application 650-1 that supports functionality as discussed herein. For example, dynamic binding application 650-1 can include a binding map, a traffic monitor, a threshold adjustment module and a metrics determination module. Dynamic binding application 650-1 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 602 accesses main memory 604 via the use of bus 601 in order to launch, run, execute, interpret or otherwise perform the logic instructions of the dynamic binding application 650-1. Execution of dynamic binding application 650-1 produces processing functionality in dynamic binding process 650-2. In other words, the dynamic binding process 650-2 represents one or more portions of the dynamic binding application 650-1 performing within or upon the processor(s) 602 in the computer system 600.

It should be noted that, in addition to the dynamic binding process 650-2 that carries out operations as discussed herein, other embodiments herein include the dynamic binding application 650-1 itself (i.e., the un-executed or non-performing logic instructions and/or data). The dynamic binding application 650-1 may be stored on a computer readable medium (e.g., a repository) such as a floppy disk, hard disk or in an optical medium. According to other embodiments, the dynamic binding application 650-1 can also be stored in a memory type system such as in firmware, read only memory (ROM), or, as in this example, as executable code within the main memory 604 (e.g., within Random Access Memory or RAM). For example, dynamic binding application 650-1 may also be stored in removable storage media 605, read-only memory 606, and/or mass storage device 607.

Example functionality supported by computer system 600 and, more particularly, functionality associated with dynamic binding application 650-1 and dynamic binding process 650-2 is discussed above in detail with reference to FIGS. 1-5.

In addition to these embodiments, it should also be noted that other embodiments herein include the execution of the dynamic binding application 650-1 in processor(s) 602 as the dynamic binding process 650-2. Thus, those skilled in the art will understand that the computer system 600 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

Various modifications and additions can be made to the example embodiments discussed herein without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method comprising:
monitoring network traffic associated with content from a content provider;
determining at least one metric associated with the network traffic;
when the at least one metric is greater than an associated threshold, remapping the content provider from a first set of content servers to a second set of content servers in the content distribution network; and
gradually allowing content requests to be delivered to the second set of content servers, wherein the gradually allowing the content requests to be delivered comprises employing a shed factor.

2. The method of claim 1, wherein the at least one metric comprises:
content popularity;
central processing unit (CPU) overhead;
latency;
content size; or
library size.

3. The method of claim 2, further comprising determining a composite metric based upon two or more metrics.

4. The method of claim 3, wherein the remapping of the content provider to a second set of content servers is based upon the composite metric.

5. The method of claim 1, wherein the gradually allowing content requests to be delivered comprises:
reporting an artificially high load for the second set of content servers; and
automatically reducing the artificially high load over an amount of time.

6. The method of claim 5, wherein the amount of time is determined based upon a cache rate for the second set of content servers.

7. The method of claim 1, wherein the shed factor is based at least upon a cache efficiency for the second set of content servers.

8. A system comprising:
at least one processor; and
memory encoding executable instructions that, when executed by the at least one processor, perform a method comprising:
monitoring network traffic associated with content from a content provider;
determining at least one metric associated with the network traffic;
when the at least one metric is greater than an associated threshold, remapping the content provider from a first set of content servers to a second set of content servers in the content distribution network; and
gradually allowing content requests to be delivered to the second set of content servers, wherein the gradually allowing the content requests to be delivered comprises employing a shed factor.

9. The system of claim 8, wherein the gradually allowing content requests to be delivered comprises:
reporting an artificially high load for the second set of content servers; and
automatically reducing the artificially high load over an amount of time.

10. The system of claim 9, wherein the amount of time is determined based upon a cache rate for the second set of content servers.

11. The system of claim 8, wherein the shed factor is based at least upon a cache efficiency for the second set of content servers.

12. The system of claim 8, wherein the associated threshold is determined based upon an anticipatory adjustment algorithm.

13. The system of claim 12, wherein the remapping is based at least upon an anticipated increase in requests for the customer.

14. The system of claim 8, wherein the determining at least one metric comprises calculating a CPU overhead for transactions.

15. The system of claim 8, wherein determining at least one metric comprises determining how quickly content can be retrieved from storage.

16. A system comprising:
a content delivery service comprising at least a first server cluster and a second server cluster, the content delivery service operable to provide content for a plurality of customers; and
a server, comprising:
at least one processor; and
memory, operatively connected to the at least one processor and encoding computer executable instructions that, when executed by the at least one processor, perform a method comprising:
providing content requests for a plurality of content to the first server cluster;
monitoring network traffic associated with content from a customer;
determining at least one metric associated with the network traffic, wherein the at least one metric comprises at least one of content popularity, central processing unit (CPU) overhead, latency, content size, or a library size;
when the at least one metric is greater than an associated threshold, remapping the customer to the second server cluster of the content delivery service; and
gradually allowing content requests to be delivered to the second server cluster, wherein the gradually allowing the content requests to be delivered comprises employing a shed factor.

17. The system of claim 16, wherein the second cluster caches the content from the customer over a period of time, and wherein gradually allowing content requests to be delivered to the second server cluster is based upon an amount of the content from the customer cached at the second server cluster.

18. The system of claim 16, wherein the second server cluster reports an artificially high load upon remapping the customer to the second server cluster.

\* \* \* \* \*